Oct. 27, 1970 J. L. CASEY ET AL 3,535,939
SAMPLING VALVES
Filed May 17, 1967 3 Sheets-Sheet 1

INVENTORS
JOHN L. CASEY
JAMES A. DOBBS
BY Young & Quigg
ATTORNEYS

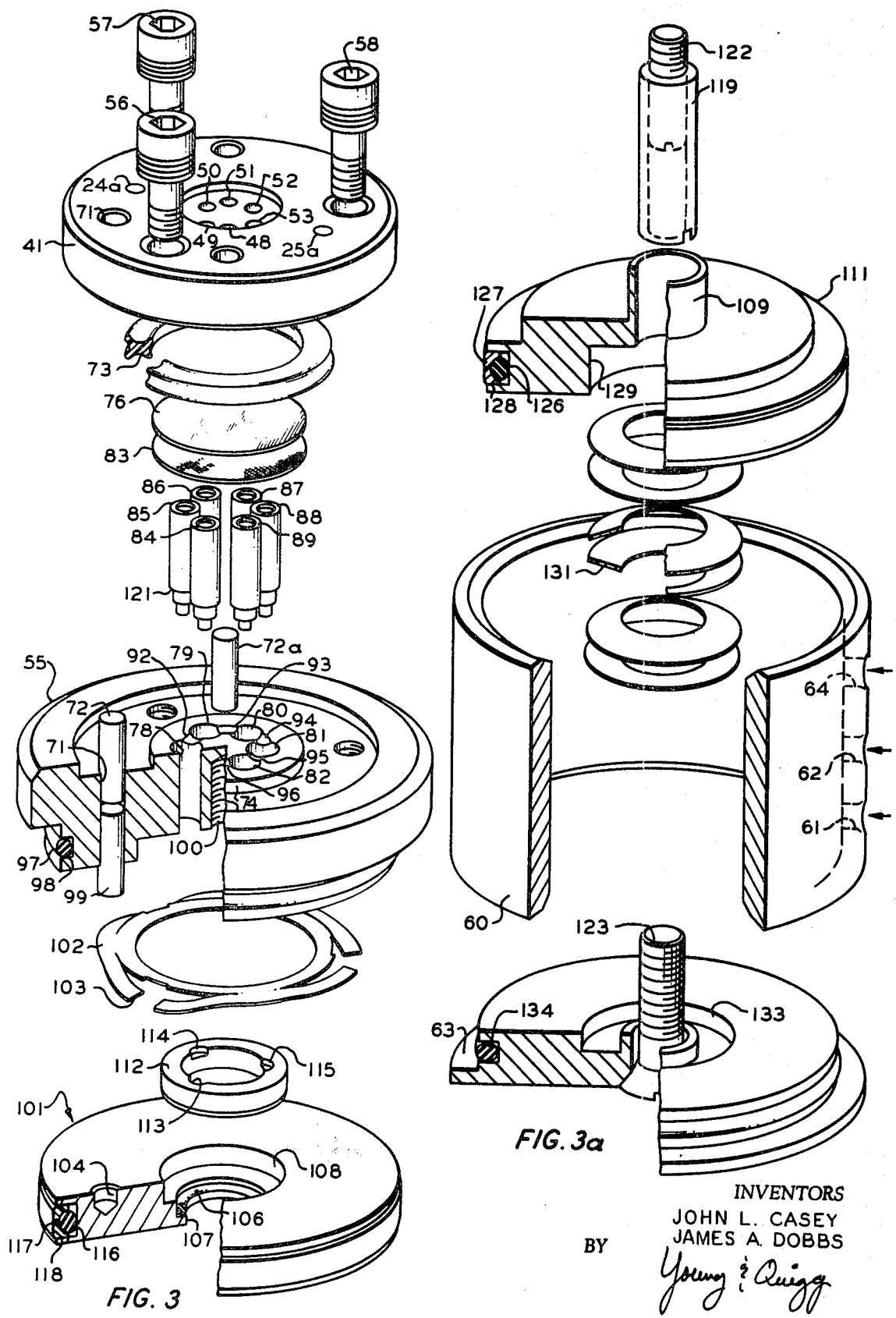

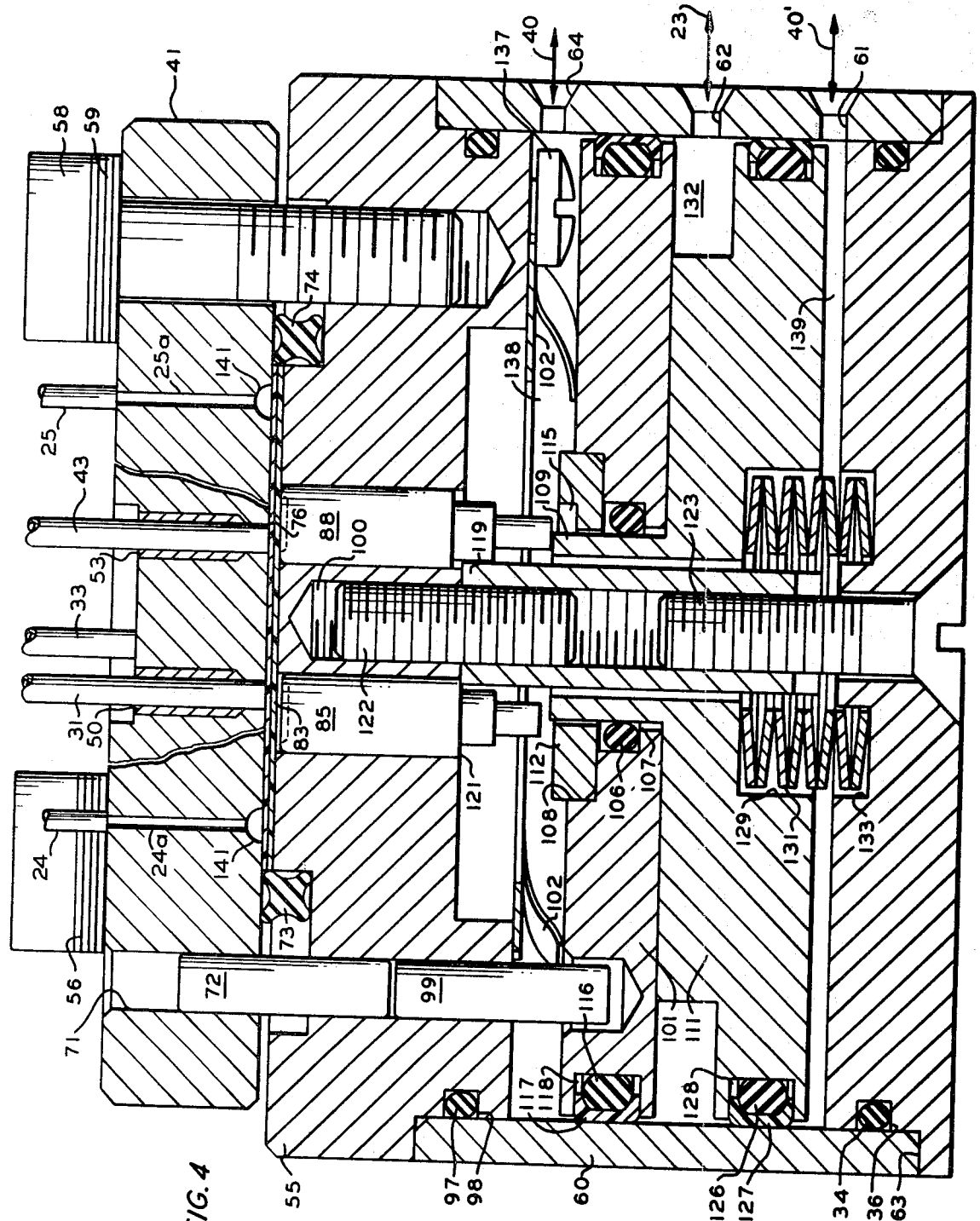

United States Patent Office 3,535,939
Patented Oct. 27, 1970

3,535,939
SAMPLING VALVES
John L. Casey and James A. Dobbs, Tulsa, Okla., assignors to Phillips Petroleum Company, a corporation of Delaware
Filed May 17, 1967, Ser. No. 639,146
Int. Cl. G01n 1/00
U.S. Cl. 73—422                                     1 Claim

ABSTRACT OF THE DISCLOSURE

In a multi-port, diaphragm-sealed valve for sampling gas streams, for example to measure very minute quantities of components in said gas stream, an inert gas, preferably the same as the carrier gas, is used to prevent air from seeping into the diaphragm-sealed area of the valve.

Figure 1:
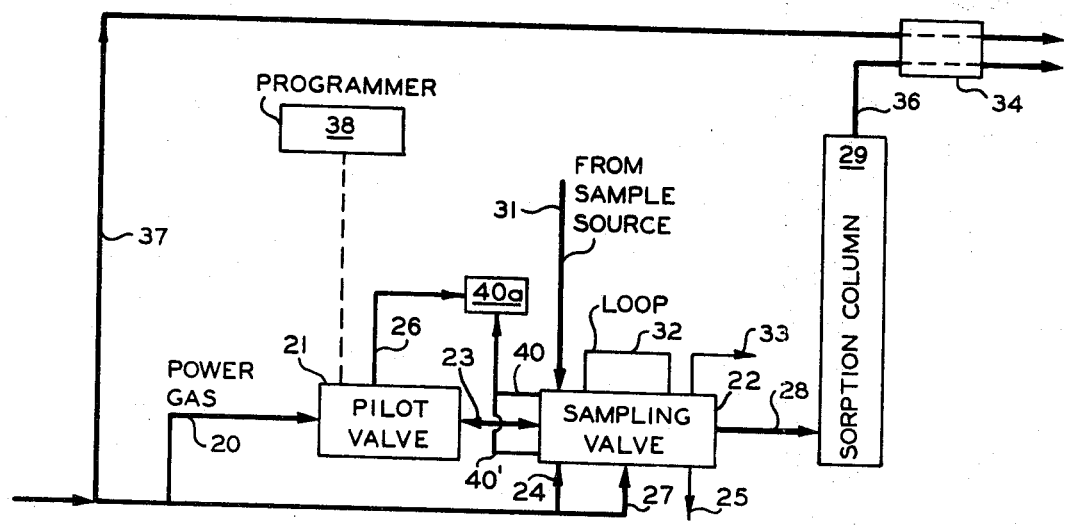

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity, and simplicity of operation make this type of analyzer very attractive for use in automatic process control.

U.S. 3,140,615, Arthur B. Broerman, incorporated herein by reference, discloses and claims a sampling valve which overcomes many problems inherent in chromatographic analyzers.

It has been proposed to sample gas streams for minute quantities of components, for example wherein full scale of the detector is at 20 parts per million using the above-mentioned sampling valve. In sampling these gas streams to detect the minute quantities of component gases, it is necessary that the sample zone be completely free from contamination from atmosphere. A small leakage, for example less than one percent, would change the quality of the reading by 50 to 100 percent.

In the aforementioned valve in which a sample zone is located between a pair of plates, a small amount of air sometimes seeps in through the area between the two plates notwithstanding the fact that an oval ring or the like is used to seal the sample zone. We have now discovered that contamination of the sample within the sample zone by atmospheric air and/or other sources from air seeping in between the plates of the aforementioned types of valves can be avoided if a barrier zone containing an inert gas is maintained between said plates, surrounds the sample zone, and is spaced from the sample zone.

In the aforementioned valve, there is a piston chamber containing pistons which actuate the opening and closing of the sample zone. The power gas is supplied to the piston chamber to actuate the pistons. The piston chamber is normally in communication with the under side of the diaphragm which separates the sample zone from the piston chamber. It has been found that small quantities of power gas can permeate the diaphragm and contaminate the sample zone. We have now further discovered that if an inert power gas, for example carrier gas, is used the contamination of the sample zone from the power gas will be eliminated.

By various aspects of this invention, one or more of the following or other objects can be obtained.

It is an object of this invention to provide a method of sampling a gas stream in which minute quantities of gaseous components in said gas stream are detected.

It is a further object of this invention to provide an improved valve for sampling a gas stream for the detection of minute quantities of gaseous components.

Other aspects, objects, and the several advantages of this invention are apparent to one skilled in the art from a study of this disclosure, the drawing, and the appended claims.

According to the invention, a sample zone in a valve for sampling a gas stream for detecting minute quantities of components in the gas stream is protected from atmospheric contamination hereby providing a barrier zone of a nondetectable, inert gas between the sample zone and the outer portion of the valve. Further, according to the invention, contamination of the sample zone by permeation of the detectable power gas through a diaphragm separating the sample zone from a piston chamber in which is present a power gas is prevented by using a nondetectable, inert power gas.

Figure 2:
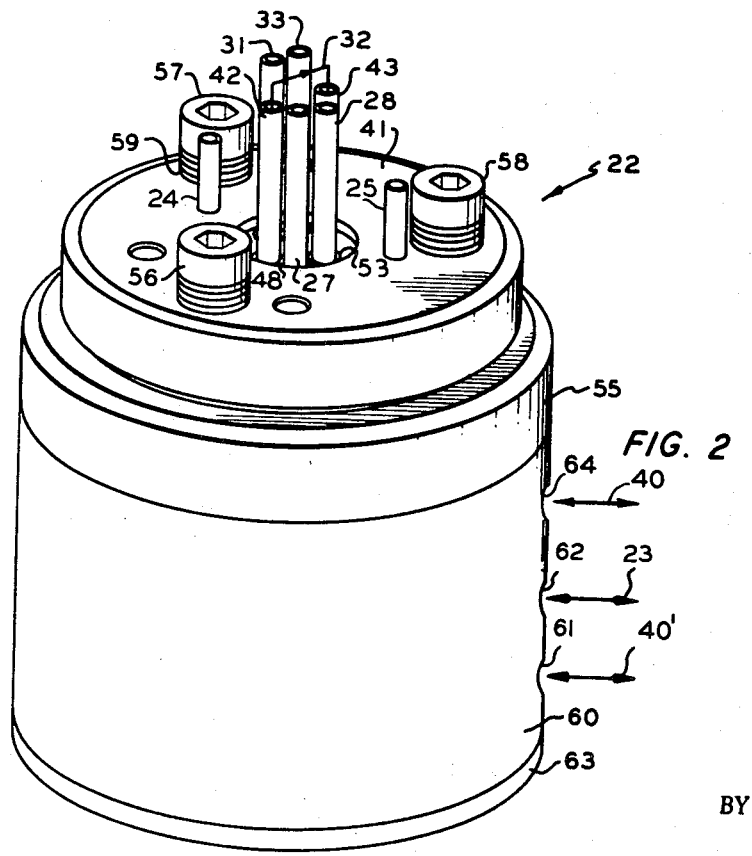

The invention will now be described with reference to the accompanying drawings in which FIG. 1 is a schematic flow diagram of a chromatographic analyzer system embodying the sampling valve of this invention; FIG. 2 is a perspective view of an assembled fluid-actuated, diaphragm-sealed valve which can be used in this invention; FIGS. 3 and 3a are exploded perspective views of the components of the diaphragm valve shown in FIG. 2; and FIG. 4 is a full sectional view of the assembled valve shown in FIGS. 2, 3, and 3a.

Reference is now made to FIG. 1 in particular, wherein a power gas passes via conduit 20 to pilot valve 21 wherein the power gas stream is directed to a flat chamber (not shown) of a pneumatically-actuated, diaphragm-sealed sampling valve 22 via conduit 23. Alternatively, the sampling valve 22 is vented via conduit 23, pilot valve 21, and pilot exhaust conduit 26. A carrier gas, such as helium or hydrogen, is passed via conduit 27, sampling valve 22, and conduit 28 to column 29. A sample source (not shown) is connected to sampling valve 22 via conduit 31, being circulated through sample loop 32 of sample valve 22, and vented therefrom via sample exhaust conduit 33. Periodically, the sample in loop 32 is passed along with the carrier gas, via conduit 28, to sorption column 29, where constituents of the sample are absorbed or adsorbed, depending upon the nature of the contact material, and then are selectively desorbed by a continuing flow of carrier gas therethrough to be identified and measured. The sampling valve system of the invention need not be used in combination with a sorption column, but the sample can be passed directly to a sensitive detector such as an ionization detector.

The effluent from the sorption column 29 passes through an analyzer indicated as thermal conductivity assembly 34, via conduit 36. The output signal from the detector 34 is passed to a recording instrument (not shown), which can be a conventional strip chart recorded. A stream of carrier gas is passed via conduit 37 from conduit 27 directly to the reference cell of detector 34, so as to balance out the effect of the carrier gas in the column 29 effluent. The sample gas to be analyzed generally enters the system periodically through conduit 31. It is drawn into conduit 33 when a slug thereof is selected for analysis. Pilot valve 21 is actuated by programmer 38, which can be operated by a time cycle or other means. For a detailed discussion of the design and manner of operation of a typical pilot valve which can be used in conjunction with this invention, see the Model 3C1 Air Switch of the Compressed Air Service Company, Dayton, Ohio, described in detail in Bulletin 20.

According to the invention, a portion of the carrier gas passes through line 24 and enters a barrier zone in valve 22. The barrier zone (which will be described with reference to FIG. 4) surrounds but is spaced from a sample zone within the central portion of the valve and eliminates contamination of sample in the sample zone from air seeping into the central portion of the valve. The carrier gas is removed through line 25 and vented to the atmosphere. In order to prevent excessive loss of carrier gas, the flow of carrier gas in line 24 can be maintained at a low flow rate as long as the carrier gas remains in the barrier zone. If desirable, a restriction can be placed on line 25 so that a slight positive pressure can be maintained in the barrier zone.

Further, according to the invention, line 40 and 40′ are connected to a second and third chamber (not shown), respectively, within the valve. Lines 40 and 40′ are in turn connected to an inert gas chamber 40a. Line 26 is also connected to inert chamber 40a. When the first chamber is expanding, the second and third chambers are contracting and inert gas is exhausted to chamber 40a through lines 40 and 40′. When the first chamber is contracting and the second and third chambers are expanding, inert carrier gases pass from pilot exhaust 26, to chamber 40a and to the second and third chambers through conduits 40 and 40′. If desirable, chamber 40a can be expandable to compensate for the difference in size of the second chamber and the sum of the first and third chambers.

When pilot valve 21 is changed from the first described position, power gas is exhausted from sampling valve 22 via conduit 23. A sample is then drawn into the sample loop via conduit 31. When power gas is supplied to sample valve 22, the sample is trapped within sample loop 32 and carrier gas passes to sample loop 32 and carries the sample to sorption column 29 or to a suitable detecting means.

In FIG. 2, there is shown a perspective view of the assembled, fluid-actuated, flexible diaphragm sampling valve of this invention, generally designated 22. Sampling valve 22 comprises an upper cap 41 provided with six small diameter conduits 27, 28, 31, 33, 42 and 43, which communicate directly with the lower surface of upper block 41 by spaced vertical passages, such as 48. Sample loop 32 communicates between conduits 42 and 43. Conduit 42, for example, is press fitted into spaced passage 48, thereby effecting a seal. Small diameter conduits 24 and 25 also communicate directly with the lower surface of upper block 41 by spaced vertical passages. Silver brazing gives mechanical strength to the press fit to prevent twisting the conduit and breaking the seal. Adjacent to upper block 41 is intermediate block 55 provided with a plurality of cylindrical passages (not seen) communicating between the upper and lower faces thereof. Allen-headed cap screws 56 to 58 secure cap 41 to intermediate block 55, which is spaced therefrom by a flexible sealing diaphragm and cushion (not seen). Plural Belleville washers, such as 59, are positioned on the shaft of the cap screws. Washers 59 permit tightening down cap 41 evenly. This is due to the feel of slowly increasing torque as turning of cap screws 56 to 58 exerts downward pressure on cap 41, gradually compressing the washers flat. There is an abrupt change in the torque as the washers flatten, indicating that further cap screw tightening would damage diaphragm and/or cap.

Disposed adjacent and supporting body 55 is a cylindrical casing or sleeve 60, provided with threaded passages 61, 62 and 64. Passage 62 communicates with the first internal annular chamber (not shown) disposed within casing 60. Passages 61 and 64 communicate with the second and third internal chambers (not shown) disposed beneath and above, respectively, the first chamber which communicates with passage 62. The three chambers are separated from each other by power pistons as will be hereinafter described. Disposed adjacent and below casing 60 is a third body 63 serving as a closure plate and forming the base of valve 22.

Referring now to FIGS. 3 and 3a, showing an exploded view of the sampling valve, cap 41 is provided with one or more vertical passages, such as 71 and 71a which accommodate cap key pins, such as 72 and 72a, that align cap 41 properly relative to body 55. An O-ring is disposed between cap 41 and body 55. Ring 73 is preferably composed of an elastomeric material which is chemically inert and heat resistant, such as viton, and seats on shoulder 74 of body 55 beneath cap 41.

A flexible sealing diaphragm 76, of a diameter about that of the inner diameter of raised portion 74, and at least sufficient to cover vertical passages 77 to 82, is disposed above body 55. Sealing diaphragm 76 is preferably composed of a thermosetting plastic which is chemically inert and heat resistant, such as Teflon (a polymer of tetrafluoroethylene). The annular area beneath vertical passages 49–53 and diaphragm 76 comprise the sample zone.

Disposed between diaphragm 76 and body 55 is a cushion 83, which is suitably a 2-mil thick cloth of Dacron (a polyester fiber). It serves to prevent the Teflon sealing diaphragm from cold flowing, and also furnishes support for it to prevent ballooning under alternating carrier and power gas pressure, which results in an extended cycling lift of the valve. Cushion 83 also serves to distribute pressure on the flexible diaphragm against the lower face of cap 41, thus evening out any variations in thickness of the diaphragm.

A set of metal plunger rods 84 to 89 are located within vertical passages 77 to 83, respectively, when the valve is assembled. These rods are machined to have a central relief in their upper end which provides an annular-shaped contact surface, which allows more sealing pressure per unit area to be exerted against the adjacent areas of cushion 83, as directed. Rods 85, 87 and 89 are 0.010 inch shorter than rods 84, 86 and 88.

Recesses 91 to 96, about 0.010–0.014 inch in depth, are provided within the circle described by passages 77 to 82, each recess communicating with the adjacent vertical passages. This type of communication between the vertical passages minimizes hand-up of sample fluid or carrier gas, and obviates excess pressure drop. (Recess 91 and passage 77 are not vertical in FIG. 3 due to the fact that they are included in that portion which has been cut away.)

A resilient O-ring 97, of generally circular cross section, is disposed in a peripheral slot 98 in the lower portion of body 55. This ring makes an air-tight seal between body 55 and supporting casing 60. Extending from the lower end of passage 71 is another key pin 99, that aligns body 55 properly relative to air-loaded first power piston 101. A threaded vertical recess 100 is disposed central of body 55 from the lower face.

A crimped, metal retracting spring 102 machined from a spring steel stock is disposed between the lower surface of body 55 and the upper surface of piston 101. The cutouts, such as 103, are aligned to permit the passage of key pins, such as 99, therethrough to anchor in recess 104 of piston 101.

A resilient O-ring seal 106, of generally circular cross section, is disposed on a shoulder 107 within a passage 108 central of piston 101. As assembled, ring 106 makes sealing contact with collar 109 of spring-loaded second power piston 111. An annular-shaped member 112 serves as a retainer for ring 106, and as a push disc for short plunger rods 85, 87 and 89. Disc 112 is provided with three notched out recesses, 113 to 115, which are adjacent to the lower ends of long plunger rods 84, 86 and 88. These recesses serve as reliefs preventing contact between the rods and disc 112. The lower edge of disc 112 is beveled to add seating body 101. Another O-ring 116 and a cap seal 117 comprising a thermosetting plastic, such as Teflon, are disposed in a slot 118 in the periphery of piston 101, permitting a sealing contact with the inner wall of casing 60.

Internally threaded cylindrical bushing 119 is provided, having a diameter so that it may pass slidably within collar 109. This upper end of this bushing provides a stop for all the plunger rods in their retracted position, by contacting a shoulder 121 of rod 84, for example. Assembly screw 122 secures the upper portion of bushing 119 to a threaded recess (not shown) in the lower face of body 55. Another assembly screw 123 secures base 63 to the lower portion of bushing 119, permitting all components between body 55 and base 63 to be compressively tightened together.

An O-ring 126 and cap seal 127 are disposed in a slot 128 in the periphery of piston 111, permitting a sealing contact with the inner wall of casing 60.

A recess 129 is provided in the lower face of piston 111, located central thereof, to accommodate Belleville washers, such as 131, which are grouped in opposing pairs to give the desired amount of upward bias to spring-loaded piston 111, this forces and maintains longer piston rods, like 89, closed, while no power gas pressure is in the annular chamber 132 (see FIG. 4) defined by pistons 101 and 111. Annular recess 133 in the upper face of base 63 provides a boss for washers 131. A resilient O-ring 134 is disposed in a peripheral slot 136 in base 63, permitting an air-tight seal between casing 60 and base 63.

In FIG. 4, the assembled valve is shown in full section, except for the assembly screws, pins and plunger rods. A screw 137 is seen which retains retracting spring 102 fastened to the lower surface of body 55. Spring 102 is located in a chamber 138 defined by body 55 and air-loaded piston 111. Chamber 138 is in communication with the under side of cushion 83 via the working tolerances surrounding the plunger rods, such as 88. Chamber 138 is also in communication with chamber 139 via the tolerances between collar 109 and bushing 119. If desirable, an O-ring can be provided in the annular channel between collar 109 and bushing 119, and a vacuum can be drawn on chamber 138 as described and claimed in copending application Ser. No. 558,742, now Pat. No. 3,387,496, to allow sampling low pressure (below atmospheric) gas streams.

Heretofore, in using the valve to sample gas streams to detect minute quantities of gases, the results were not always consistent because a slight amount of air often leaked between the upper block 41 and the intermediate block 55, and between upper block 41 and diaphragm 76 into the sample zone. According to the invention, this seepage of air into the sample zone is prevented by providing an annular groove 141 in the lower face of upper block 41, which annular groove surrounds the sample zone. Groove 141 is in communication with vertical passages 24a and 25a. Inert carrier gases circulate through annular groove 141 which forms a barrier zone between the sample zone and the outer portions of the valve. Thus, any atmospheric air which seeps past O-ring 73 will be picked up by the inert carrier gas in the annular group and will be purged to the atmosphere.

Normally, when air is used for the power gas and/or chambers 138 and 139 are open to the atmosphere, air has a tendency to permeate the diaphragm and contaminate the sample. Further, according to the invention, the use of inert carrier gas as a power gas, and as applied to chambers 138 and 139, prevents contamination of the sample due to diffusion or permeation of the power gas and atmospheric air through the diaphragm 76.

In operation, in the absence of power gas flowing to chamber 132, the valve is in the unexcited, "fail safe" condition, preventing intermingling of sample fluid and carrier gas streams. In this at-rest position, depicted in FIG. 4, spring washers 131 are exerting force on spring-loaded power piston 111, and through collar portion 109 thereof, holding adjacent long piston rods 84, 86 and 88 in sealing contact with adjacent portions of cushion 83 and sealing diaphragm 76, causing the latter to seal against the lower face of cap 41. Short plunger rods 85, 87 and 89, not being in contact with collar 109, rest on the upper end of bushing 119, the adjacent portions of cushion and diaphragm being relieved, allowing flow between adjacent vertical passages.

Now, carrier gas flowing continuously in conduit 27, under greater than ambient pressure, enters valve 22 via spaced passage 48, passing downwardly to the lower face of cap 41, and over toward either spaced passage 49 or 53, depending upon whether piston rod 84 or 89 is in sealing contact with the diaphragm. Since in the unexcited position only longer rod 84 is in sealing contact, carrier gas flows from recess 96 across the top of vertical passage 82, under the diaphragm, over a recess 95 and into spaced passage 52, and out of valve 22, via conduit 28 to sorption column 29. Concurrently, a sample from a sample source can flow through conduit 31, entering valve 22 through spaced passage 50. Since longer rod 86 is in sealing contact with the diaphragm, sample fluid can flow from recess 12 across the top of vertical passage 78 under the diaphragm, over to recess 91 and into passage 49, and out of valve 22, via conduit 42, into sample loop 32. Sample fluid can re-enter valve 22 from loop 32 via conduit 43 and passage 52. Since longer rod 88 is in sealing contact with the diaphragm, sample fluid can flow from recess 94 across the top of vertical passage 80, under the diaphragm, over to recess 93 and into spaced passage 51, and out of valve 22, via conduit 33.

When pilot valve 21 is switched to its alternate position, as determined by programmer 38, now power gas flows through conduit 23 to sampling valve 22, entering chamber 132 via passage 62. As the power gas pressure builds up in the chamber 132, it exerts force on air-loaded power piston 101, first overcoming weak retracting spring 102 and contacting shorter piston rods 85, 87 and 89, raising them to make sealing contact with adjacent portions of cushion 83 and diaphragm 76, causing the latter to seal against the lower face of cap 41, thus shutting off sample and carrier gas flow through valve 22.

Subsequently, further pressure build-up in chamber 132 exerts sufficient force on spring-loaded power piston 111 to overcome stronger Belleville washers 131, allowing longer rods 84, 86 and 88 to retract into their vertical passages about .010 inch, by seating on the upper end of bushing 119. The notched recesses, such as 115, must be at least .020 inch deep, .010 inch of which is to allow short rods, such as 85, to rise into sealing position on power gas signal, and the other .010 inch of which is to allow long rod, such as 88, to retract sufficiently open to allow flow across the vertical passage between the recesses adjacent the spaced passages.

This sequence is characterized as a "make seal before break seal" mode of operation, which prevents leakage of fluids from one path of flow to the alternate, as the paths of flow are being alternated.

Carrier gas from conduit 27 still enters valve 22 via passage 48, passing downwardly to the lower face of cap 41. Since in this excited position, shorter rod 89 is in sealing contact with the diaphragm, carrier gas flows from recess 96 across the top of vertical passage 77, under the diaphragm, over to recess 91 and into spaced passage 49, and thence to sample loop, driving the sample slug trapped therein before it. The carrier gas, with sample fluid entrained, re-enters valve 22 from loop 32 via conduit 43 and spaced passage 52. Since shorter rod 87 is in sealing contact with the diaphragm, sample flows from recess 94 across the top of vertical passage 81, under the diaphragm, over to recess 95 and into spaced passage 53, and out via conduit 28 to sorption column 29 for separation of the constituents in the sample slug in said column.

In this condition, shorter rod 85 is in sealing contact with the diaphragm. As the power gas is supplied, sample gas will be forced into valve 22 via conduit 33, into spaced passage 51, over recess 93, across vertical passage 79, into recess 92 and removed from valve 22 through passage 50. Since there is no pressure differential between lines 31 and 33, generally no sample will flow through sample valve 22 after the exhausting of the gas when the valve is in the excited condition.

When pilot valve 21 switches back to the non-excited position, power gas bleeds down through conduit 23, the power pistons return to their initially described position in reverse sequence and the two sets of piston rods also revert to the position shown in FIG. 4. Thus, the paths of flow of sample and carrier gas will return to that initially described. The frequency with which the sample slug is passed to column 29 is determined by the operation of the pilot valve 21, controlled through programmer 38.

Whereas the invention has been described with reference to an external sample loop 32, it is within the scope of the invention to provide a sample loop within valve 22, for example, within body 41.

Reasonable variations and modifications are possible within the scope of the foregoing disclosure, the drawings, and the appended claims without departing from the spirit thereof.

We claim:

1. In a multi-port, diaphragm-sealed piston-operated valve comprising
    a first plate member having a relatively flat first surface and a plurality of spaced first passages extending through said first member and opening on said first surface,
    a second plate member having a relatively flat second surface in juxtaposition to said first surface, a plurality of recessed portions in said second surface, and at least one second passage terminating adjacent two of said recessed portions to provide a flow path therebetween,
    a diaphragm disposed between said faces and covering an area defined by said first passages, said recessed portions and said second passage,
    a rod positioned in said second passage, said rod having an upper face which, when applying pressure to said diaphragm, will seal the space between two of said first passages, said rod being actuated by a piston in a piston chamber, said piston being biased in a first position in said piston chamber, a second chamber defined by said piston and said second plate member, means for exhausting fluid pressure in said second chamber as said piston chamber expands, and means for exhausting gas from said piston chamber as said piston chamber contracts;
the improvement which comprises:
a recess in said first surface surrounding and spaced from said first passages,
a source of inert gas under pressure greater than atmospheric,
conduit means connected between said source of inert gas and said recess to supply said inert gas to said recess to prevent leakage of atmospheric air into said first passages,
conduit means connecting said source of inert gas to said piston chamber so that said inert gas serves as power fluid to move said piston away from said first position, and
conduit means connecting said means for exhausting fluid pressure in said second chamber to said source of inert gas.

References Cited
UNITED STATES PATENTS

| | | | |
|---|---|---|---|
| 2,506,535 | 5/1950 | Zaikowsky | 73—27 |
| 3,111,849 | 11/1963 | Broerman | 73—422 |
| 3,140,615 | 7/1964 | Broerman | 73—422 |
| 3,387,496 | 6/1968 | Broerman | 73—422 |
| 3,417,605 | 12/1968 | Hahn | 73—422 |

RICHARD C. QUEISSER, Primary Examiner

J. K. LUNSFORD, Assistant Examiner

U.S. Cl. X.R.

73—27